Dec. 6, 1949     F. M. NUNAMAKER     2,490,279
FISH LINE CARRYING AND DRYING DEVICE
Filed Sept. 9, 1947
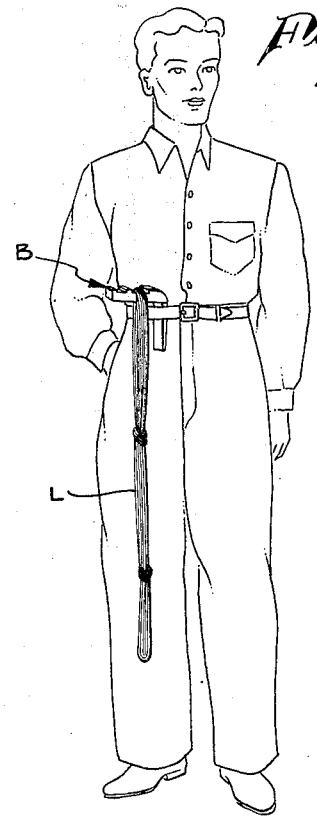
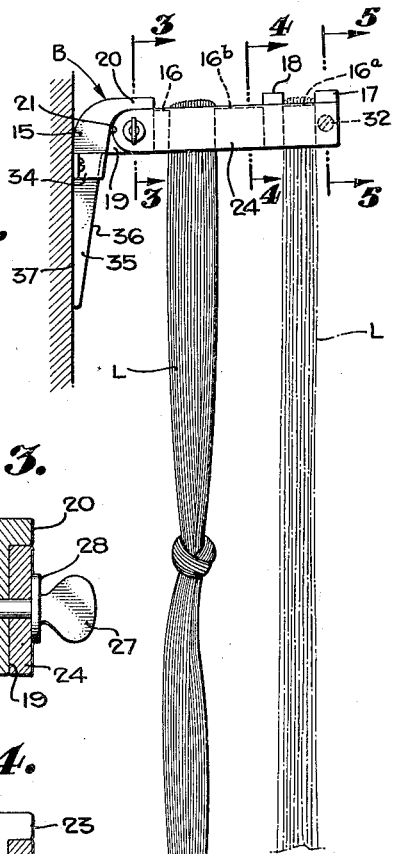
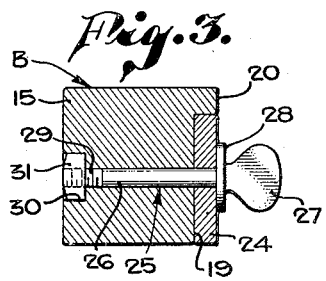
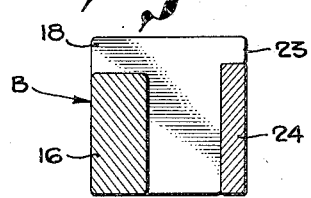
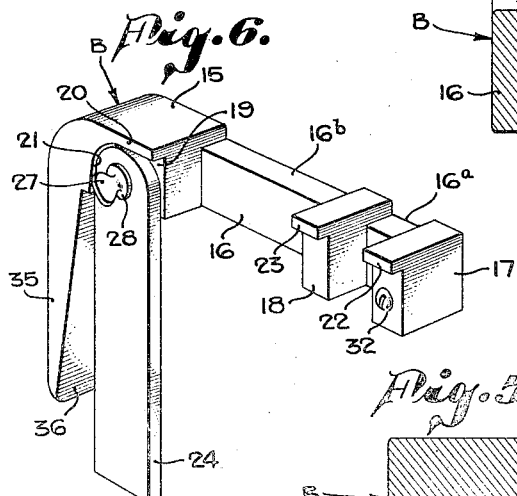
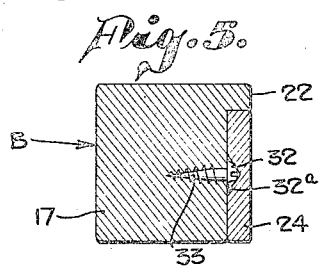
INVENTOR.
*Fred M. Nunamaker*
BY
ATTORNEY Patented Dec. 6, 1949

2,490,279

UNITED STATES PATENT OFFICE 2,490,279

FISHLINE CARRYING AND DRYING DEVICE

Fred M. Nunamaker, Hastings, Nebr.

Application September 9, 1947, Serial No. 773,032

7 Claims. (Cl. 242—104)

Fishermen realize the difficulty entailed in drying fishing lines, and particularly as to tangling of lines as they are unwound from reels, which must be done in order to effect thorough and complete drying of the lines. Also, that to prevent deterioration of the fishing line the drying operation should be initiated as soon as possible after the fisherman finishes fishing, rather than wait until he returns to his home or camp, where unwinding of the line from the reel can be performed more conveniently and suspended from any available support.

It is a purpose of my invention to provide, a simple, inexpensive, and durable device by which a fishing line as it is unwound from a reel can be readily wound in looped form and suspended from the body of the fisherman so that it can be carried from the point of fishing to his home or camp, and without the possibility of the line becoming entangled with the loops of itself or any foreign object. Thus one is afforded means by which the drying of the line can be initiated immediately following completion of use thereof.

It is also a purpose of my invention to provide a line carrying device which permits of the line in the untangled form as above described, to be suspended from any suitable support for completion of the drying operation once the fisherman reaches his destination.

A further purpose of my invention is the provision of a line carrying device which affords the suspension for drying and without tangling one with the other, of a plurality of fishing lines, and likewise the suspension in separated form of the lines from a suitable support.

I will describe only one form of line drying and carrying device embodying my invention and will then point out the novel features thereof in claims.

In the accompanying drawings:

Fig. 1 is a view showing in perspective one form of fish line carrying and drying device embodying my invention as it is mounted on a person's body.

Fig. 2 is an enlarged view showing the device as it is mounted on a wall bracket for completion of the line drying operation.

Fig. 3 is an enlarged vertical sectional view taken on the line 3—3 of Fig. 2.

Fig. 4 is an enlarged vertical sectional view taken on the line 4—4 of Fig. 2.

Fig. 5 is an enlarged vertical sectional view taken on the line 5—5 of Fig. 2.

Fig. 6 is an enlarged perspective view of the device with the latch bar thereof in open position.

With specific reference to the drawings my device in its present form comprises a body B made of plastic, wood or any light and strong material, which is of elongated form and composed of a head 15 from one end of which a bar 16, preferably of rectangular form in cross section, extends not from the center of the head end but from one side thereof so as to offset it from the major axis of the head.

At the distal end of the bar 16 and integral therewith, is a terminal block 17, while likewise integral with the bar is a spacer block 18 spaced from the block 17. These blocks are of the same cross sectional area as the head 15, and the positioning of the spacer block from the head and the terminal block is such as to divide the bar 16 into a short section 16a and a long section 16b.

As best shown in Fig. 6, the head 15 is indented at one side to form a flat seat 19 bounded on its upper edge by a straight flange 20 curving downwardly at one end into a vertical shoulder 21. At the same side as the flange 20, the blocks 17 and 18 are formed with lips 22 and 23, respectively, longitudinally alined with the flange, and provided for the purpose of forming stops to define the closed position of a latch arm 24.

The arm 24 is shaped and mounted for pivotal movement on the seat 19 of the head 15 to occupy the open position shown in Fig. 6 or the closed position shown in Figs. 1 and 2. Such mounting may comprise a bolt 25 having a shank 26 extending loosely through a suitable opening in both the arm 24 and the head 15, and having on the arm end a head 27 of winged form, and an annular shoulder 28 which bears against the latch arm to limit movement of the shank inwardly through the head and arm to definitely position the screw-threaded end 29 of the shank in a recess 30 in the outside face of the head 15. To this threaded shank end a nut 31 is adapted to be applied, and the shape of the recess is such as to hold the nut against turning, and to thereby cause clamping of the latch arm 24 in either of its extreme positions by screwing the bolt inwardly on the nut.

In the closed position of the latch arm 24 (see Fig. 5) it abuts the stops 22 and 23, where it is automatically latched by a keeper lug 32 engaging within a pocket 32a, assuming, of course, that the latch arm is clamped rather firmly to the head 15. The head of a screw 33 threaded in the block 17, may be employed as the lug, while the pocket is formed on the inner side of the latch arm.

That the body B and the latch arm may be either carried on the person, as shown in Fig. 1, or mounted on a wall bracket 34 as shown in Fig. 2, the head 15 is provided with an integral and depending extension 35 the latch arm side 36 of which is inclined toward the linear outer side 37 of the extension, so as to give edge form to the extension as a whole. Preferably the angle between the body B and the extension 35 is greater than a right angle so that the body as supported by the extension both on the person and the wall bracket, is inclined upwardly to cause fish lines suspended from the body to tend to slide inwardly rather than outwardly on the bar, and thus assist in preventing accidental dismounting of the fish lines therefrom.

In the use of my device the extension 35 may serve as a handle to be gripped, say in the left hand, and the body B held in substantially a horizontal position. With the device so held and the latch arm 24 in open position a wet fishing line indicated at L in Fig. 2 as unwound from a reel can be wound on the short bar section 16a between the blocks 17 and 18, in relatively long loops and the loops held contiguous one to the other by the blocks to facilitate winding. As will be understood, the leading end of the line is first tied on the bar in a loop only sufficiently large to permit it to be passed over the block 18 onto the long bar section 16b.

After the line has been wound on the short bar section as described, it is knotted, preferably, at two spaced points as shown in Fig. 2, to hold the loops against separation. Once this is done, the line is ready to be passed over the block 18 onto the long bar section 16b, to clear the short bar section for winding, if desired, of a second line thereon in the same manner as the first, followed by knotting of the looped line, and the final step of passing it over the block 18 onto the long bar section 16b along side the first line. In this manner a number of lines can be mounted on the long bar section where each can be spread to accelerate drying.

Once the lines are applied to bar 16 as described, the latch arm is moved to closed position and secured by the keeper lug 32. In such closed position the arm serves, in conjunction with the head 15, the bar 16, and the block 18 to confine the lines in looped and suspended form on the bar.

By virtue of the extension 35, the device can be carried on a person by extending the extension downwardly to the inner side of his pants belt, or to the inner side of the waist portion of the trousers. As so applied the body B is held extended from the person's body in an upwardly inclined position with the lines hung from the bar 16. Thus the lines can be carried in suspended position to allow them to dry while the fisherman is in transit to camp or home, and without any possibility of the lines tangling.

If the lines are not completely dry by the time the fisherman reaches his destination, the device may be mounted in the bracket 34 so that the body B is again inclined upwardly, by merely extending the extension 35 downwardly through the bracket. Thus the lines are again suspended to complete the drying operation.

Obviously, to remove the lines from the device incident to winding them on reels, the latch arm is first swung to open position by exerting sufficient force downwardly thereon to disengage it from the keeper lug 32, when access is had to the bar 16 for removal of the lines.

Although I have herein shown and described only one form of fish line carrying and drying device embodying my invention, it is to be understood that various changes and modifications may be made therein without departing from the spirit of my invention and the spirit and scope of the appended claims.

I claim:

1. A fish line carrying and drying device, including: an elongated rigid body upon which fishing lines may be wound in looped form so as to depend therefrom; and means pivoted on said body about an axis transversely of said body to occupy one position in which the body is exposed to permit winding of lines thereon, and another position in which the lines are confined on said body.

2. A fish line carrying and drying device, including: an elongated rigid body upon which fishing lines may be wound in looped form so as to depend therefrom; means movable on said body to occupy one position in which the body is exposed to permit winding of lines thereon, and another position in which the lines are confined on said body; and an extension fixed on and in angular relation to said body to provide a handle by which the body can be held in one hand while lines are wound thereon with the other hand, and the body supported substantially horizontally on a person's body or on a wall bracket after application of the lines to hold the latter in depending positions thereon for drying.

3. A fish line carrying and drying device, including: an elongated rigid body upon which fishing lines may be wound in looped form so as to depend therefrom; a latch arm pivoted on one end of said body to occupy one position in which the body is exposed to permit winding of lines thereon, and another position in which the lines are confined on the body; and coacting means on said body and said arm for releasably securing said arm in said other position.

4. A fish line carrying and drying device, including: a bar; a head on one end of said bar; a member fixed on the other end of said bar; a second member fixed to said bar and spaced from the first mentioned member; said head and members of greater width than said bar; an extension fixed to said head and disposed at an angle to said bar; and an arm pivoted on said head to occupy one position in which it is at an angle to said bar, and another position in which it parallels said bar and spans said head and said members.

5. A fish line carrying and drying device, including: a bar; a head on one end of said bar; a member fixed on the other end of said bar; a second member fixed to said bar and spaced from the first mentioned member; said head and members of greater width than said bar; an extension fixed to said head and disposed at an angle to said bar; an arm pivoted on said head to occupy one position in which it is at an angle to said bar, and another position in which it parallels said bar and spans said head and said members; and coacting means on said first mentioned member and said arm for frictionally latching said arm in said other position.

6. A fish line carrying and drying device, including: a bar; a head on one end of said bar; a member fixed on the other end of said bar; a second member fixed to said bar and spaced from the first mentioned member; said head and members of greater width than said bar; an extension fixed to said head and disposed at an angle to said bar; an arm; means including a bolt extending through said arm and head, for mounting said arm on said head to occupy one position in which it is at an angle to said bar, and another position in which it parallels said bar and spans said head and said members; and coacting means on said first mentioned member and said arm for frictionally holding said arm in said other position.

7. A fish line carrying and drying device, including: a bar; a head fixed on one end of said bar and projecting to one side thereof; a member fixed on the other end of said bar and projecting to the same side thereof as said head; a second member fixed to said bar between said head and the first mentioned member and projecting to the same side of said bar as said head; an extension fixed to said head and disposed at an obtuse angle to said bar; longitudinally aligned projections on the outer sides of said head and said members; an arm pivoted on said head to occupy one position in which it is at an angle to said bar and another position in which it engages said projections so as to parallel said bar and span said head and said members; and means on said arm and said first mentioned member for latching said arm in parallel position to said bar.

FRED M. NUNAMAKER.

REFERENCES CITED

The following references are of record in the file of this patent:

UNITED STATES PATENTS

| Number | Name | Date |
|---|---|---|
| 1,035,825 | Hesser | Aug. 13, 1912 |
| 1,474,402 | Caple | Nov. 20, 1923 |
| 1,702,919 | Shand | Feb. 19, 1929 |

FOREIGN PATENTS

| Number | Country | Date |
|---|---|---|
| 541,707 | Great Britain | Dec. 8, 1941 |
| 626,707 | Germany | Feb. 29, 1936 |